Nov. 27, 1923.
W. J. MUSCH
1,475,856
EGG TURNING TRAY
Filed Oct. 2, 1922     2 Sheets-Sheet 1
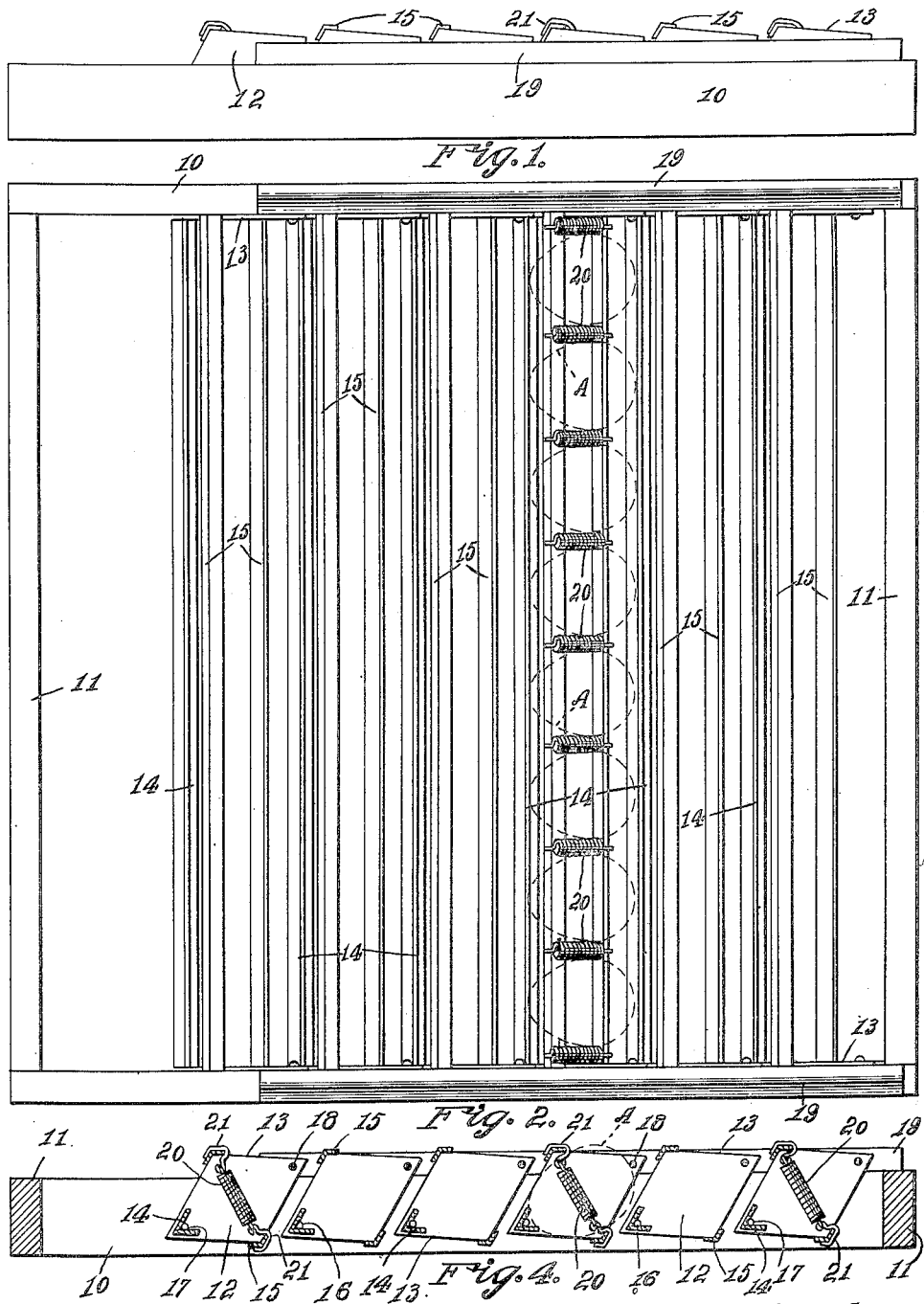

Nov. 27, 1923.
W. J. MUSCH
EGG TURNING TRAY
Filed Oct. 2, 1922
1,475,856
2 Sheets-Sheet 2
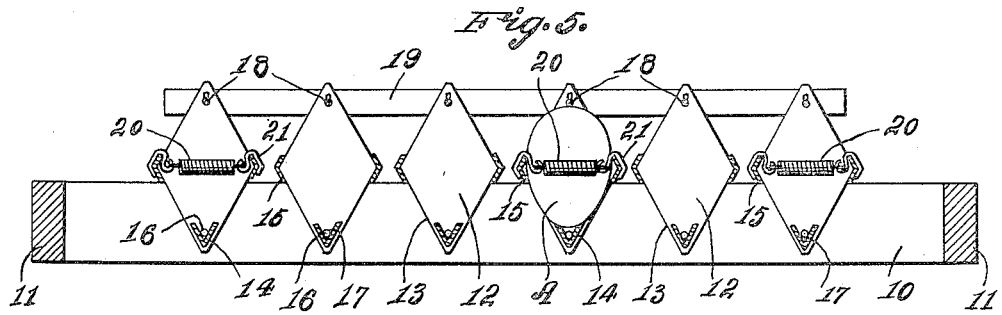
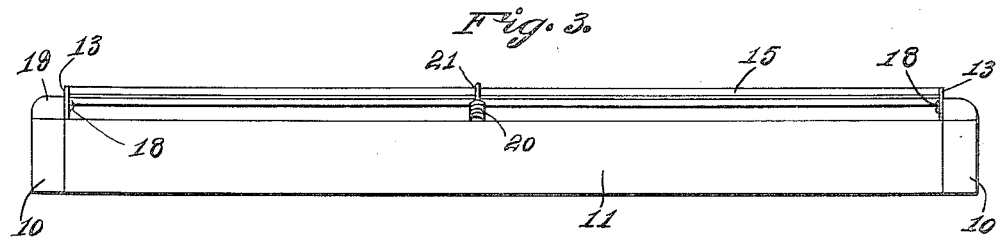
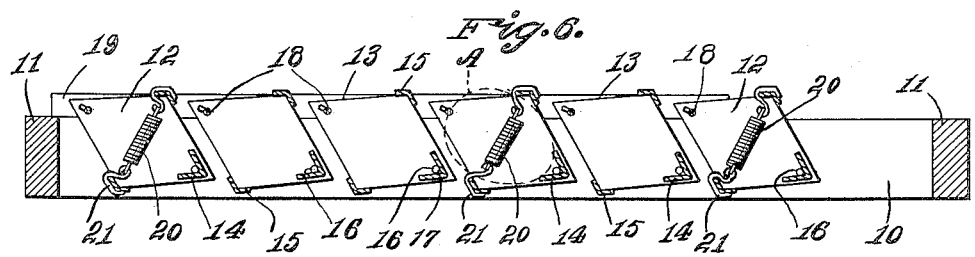
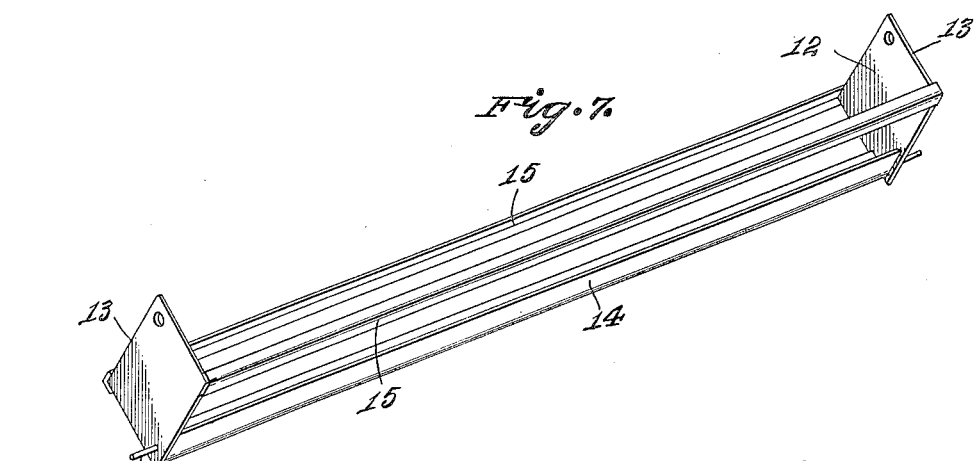
W. J. Musch
INVENTOR
BY Victor J. Evans
ATTORNEY
WITNESS:

Patented Nov. 27, 1923.

1,475,856

UNITED STATES PATENT OFFICE.

WARREN J. MUSCH, OF HARTFORD, KANSAS.

EGG-TURNING TRAY.

Application filed October 2, 1922. Serial No. 591,898.

*To all whom it may concern:*

Be it known that I, WARREN J. MUSCH, a citizen of the United States, residing at Hartford, in the county of Lyon and State of Kansas, have invented new and useful Improvements in Egg-Turning Trays, of which the following is a specification.

This invention relates to egg trays for incubators and has for its object the provision of a tray equipped with novel egg holders provided with means for reversing the same whereby the eggs will be automatically turned simultaneously.

An important object is the provision of a device of this character in which all the eggs in the tray will be turned at one and the same time without involving handling any of the eggs themselves, the mechanism operating automatically upon movement of a control bar.

Another object is the provision of a device of this character in which the eggs are held in rows in cage like holders with which are associated slidably mounted springs which may be initially adjusted to hold the eggs in slightly spaced relation, or which may be placed merely at the ends of the rows and which will, in either instance prevent the eggs from knocking together and possibly cracking.

An additional object is the provision of a device of this character which will be simple and inexpensive in manufacture, efficient and durable in use, a great time and labor saver and a general improvement in the art.

With the above and other objects and advantages in view the invention consists in the details of construction to be hereinafter more fully described and claimed and illustrated in the accompanying drawings, in which:

Figure 1 is a side elevation of my tray,

Figure 2 is a plan view thereof,

Figure 3 is an end view,

Figure 4 is a longitudinal vertical section,

Figure 5 is a similar view showing the holders as rocked into the intermediate position, Figure 6 is a similar view showing the holders as swung into the other position for turning the eggs and Figure 7 is a perspective view of one holder detached.

Referring more particularly to the drawings I have shown the tray as comprising a rectangular frame including longitudinal bars 10 connected by cross bars 11. Located within this frame is a series of egg holders designated broadly by the numeral 12. Each holder comprises diamond shape end plates 13 connected at one corner by a trough shaped bar 14 and connected at two opposite corners by rods or bars 15, this structure forming a species of cage in which it is intended that the eggs indicated at A be placed with either the points or the butts of the eggs resting within or upon the trough shaped member 14. It should be mentioned that the members 15 are trough shaped and that the end plates 13 together with the members 14 and 15 are formed preferably of sheet metal as this material is capable of being easily kept clean.

In order that the holders may be properly mounted for pivoted movement within the frame, I provide pins 16 which project beyond the inner faces of the longitudinal bars 10 and through holes 17 in the lowermost angles of the end plates 13.

The sole remaining angles of the end plates are pivotally connected, at 18, with bars 19 which are adapted to rest upon the upper edges of the frame for holding the holders in either selected position, thus acting as stops. One or both bars 19 may be provided with extensions to serve as handles to facilitate swinging the holders from the position shown in Figure 4 to that shown in Figure 6.

In order that the eggs may be properly held in the holders, I provide each holder with one or more coil springs 20 which have their ends carrying hooks 21 slidably engaged upon the bars 15, it being intended that one of these springs be placed between the successive eggs, or else that one spring member be used at the end of each row.

In the use of the device it will be seen that the eggs are placed in a row within each of the holders 12, the holders being at this time in upright position as shown in Figure 5. The holders are then moved to one extreme limit of their movement, for instance into the position shown in Figure 4. Whenever it is desirable to turn the eggs, it is merely necessary that the operator grasp either or both of the bars 19 and move them longitudinally whereupon the holders will pass from the position shown in Figure 4 to the position shown in Figure 5 and then into the position shown in Figure 6, the eggs being thus turned over as is necessary during incubation. In actual practice, after the 18th day the eggs are removed from the present device and placed within the ordinary hatching tray, not illustrated as forming no part of the present invention.

From the foregoing description and a study of the drawings it will be apparent that I have thus provided a simply constructed and consequently inexpensive egg tray in which the construction is such that all the eggs may be quickly and easily turned by a single operation so that the device will be a great time and labor saver. Owing to the simplicity of the construction and the fewness of the parts it is apparent that there is nothing to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. An egg turning tray comprising a rectangular frame, a plurality of holders pivoted within said frame, and bars pivotally connected with said holders and movable longitudinally whereby to tilt the holders in one direction or the other, each holder consisting of a cage like structure including end plates and spaced connecting bars, and coil springs carrying hooks slidably engaged upon said last named bars and designed to space the successive eggs apart.

2. An egg turning tray comprising a rectangular frame, a plurality of egg holders mounted within the frame and each including a pair of diamond shaped end plates provided at one angle with holes, a trough shaped bar connecting the lower most angles, other bars connecting the side angles of each pair of end plates, egg spacing means slidably mounted upon said side bars, and pivot pins passing through said holes into said frame.

In testimony whereof I affix my signature.

WARREN J. MUSCH.